Sept. 10, 1946.  D. M. PHILLIPS  2,407,445
ELECTRICAL CONDUCTING SWING JOINT
Filed June 30, 1943

Inventor
Dwight M. Phillips
by
Attorney

Patented Sept. 10, 1946

2,407,445

UNITED STATES PATENT OFFICE 2,407,445

ELECTRICAL CONDUCTING SWING JOINT

Dwight M. Phillips, Fullerton, Calif., assignor to Chiksan Tool Company, Brea, Calif., a corporation of California Application June 30, 1943, Serial No. 492,830

9 Claims. (Cl. 174—21)

This invention relates to rotary connections or swing joints and relates more particularly to an electrical conducting swing joint. A general object of the invention is to provide a dependable long-wearing and very efficient swing joint of this character.

Another object of this invention is to provide a swing joint of the character referred to embodying a long wearing and effective sealing means for preventing the leakage of fluid from between the relatively rotatable parts of the joint.

Another object of this invention is to provide a joint of the character mentioned that embodies a simple, positive anti-friction bearing means for connecting the relatively rotatable parts for free relative turning.

Another object of this invention is to provide a joint of the character referred to having positive long wearing contact means for maintaining the relatively rotatable parts in electrical connection at all times.

Figure 1:
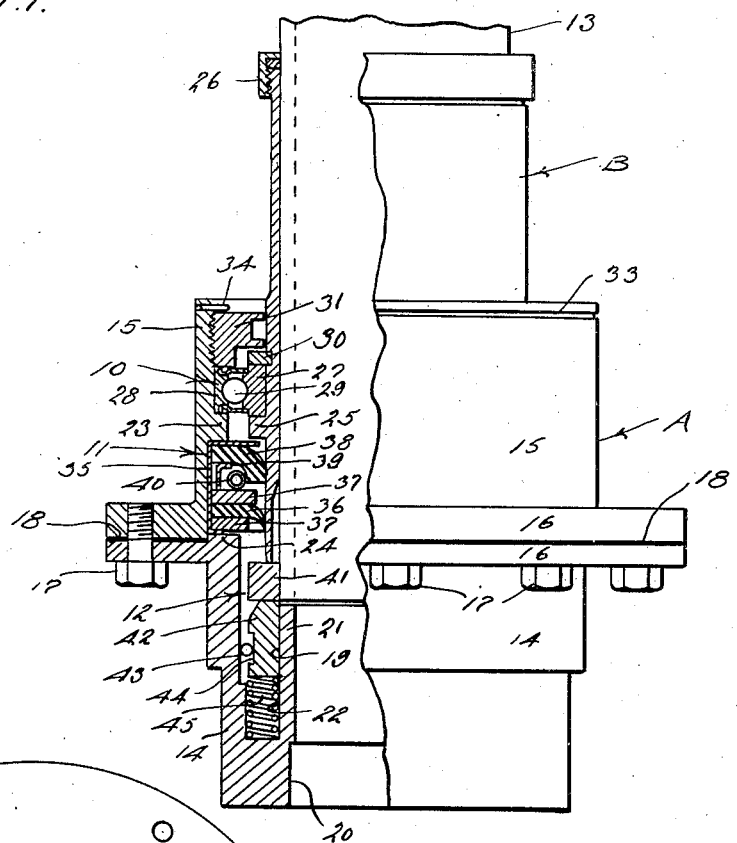
Figure 2:
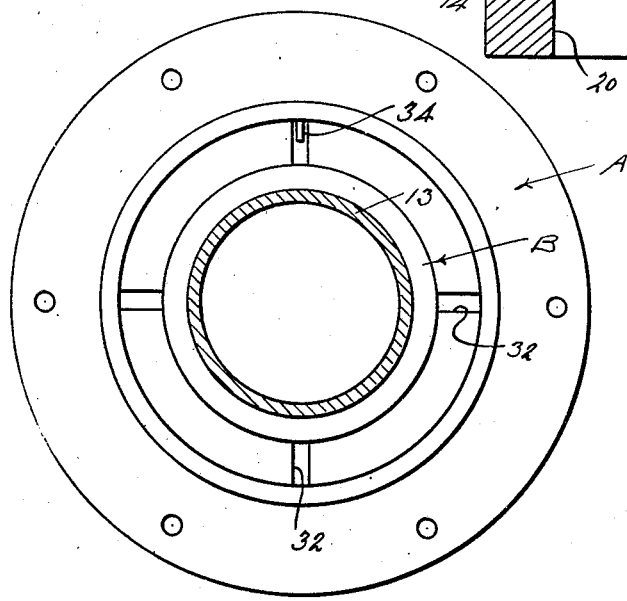

The various objects and features of my invention will be fully understood from the following retailed description of a typical preferred form and application of the invention, throughout which description reference is made to the accompanying drawing, in which:

Fig. 1 is a side elevation of the swing joint of this invention with the principal parts broken away to appear in longitudinal cross section and Fig. 2 is an end view of the joint.

The improved swing joint may be said to comprise generally two relatively rotatable body sections A and B, anti-friction bearing means 10 connecting the sections A and B for free relative rotation, sealing means 11 for preventing the leakage of fluid from between the sections A and B and contact means 12 for maintaining electrical connection between the sections.

The sections A and B form the body elements of the joint and may be modified or varied in construction to adapt the joint for use in various situations and for connection with different elements of electrical conducting and fluid handling systems. In the present case it may be assumed that the section A is adapted to be secured to a relatively stationary part of such a system and that the section B is to be associated with a tube 13.

The body section A is preferably made up of two main parts 14 and 15 to facilitate the assembling of the joint. The parts 14 and 15 are in the nature of flanged coupling elements having abutting radial flanges 16 at their inner ends connected by spaced screws 17. A suitable gasket 18 may be engaged between the flanges 16. The flanged parts 14 and 15 are elongate tubular elements connected in co-axial relation. The interior of the part 14 is shaped to contain the contact means 12. A deep annular socket or groove 19 enters the part 14 from its inner end portion. The groove 19 is in spaced concentric relation with the opening 20 of the tubular part 14 leaving a tubular partition or wall 21. The outer surface or bottom of the groove 19 has a plurality of circumferentially spaced bores or sockets 22. The partition or wall 21 does not extend to the inner end of the part 14 and, as illustrated in Fig. 1, the inner end of the wall 21 occupies a plane spaced some distance from the plane of the flanges 16.

The interior of the part 15 is shaped and proportioned to contain the bearing means 10 and the sealing means 11 and to receive the section B. The opening or bore of the part 15 is of substantial diameter, being larger in diameter than the opening 20 and the groove 19 of the part 14. An annular flange 23 is provided on the internal wall of the part 15 and is spaced between the inner and outer ends of the part. The inner end of the part 14 has a raised bead 24 fitting within the tubular part 15 to hold the parts 14 and 15 in the co-axial relation.

The section B is an elongate tubular element which extends through the part 15 of the section A to project into the part 14. Section B is preferably of uniform internal diameter to receive and have full engagement with the tube 13. An external annular rib or flange 25 is provided on the section B and lies in the same transverse plane as the flange 23. The flange 25 may be somewhat narrower than the flange 23. The section B is of sufficient length to extend a substantial distance outwardly beyond the section A and its outer end portion may carry a small packing gland 26 for sealing with the tube 13. The tube 13 extends completely through the section B and protrudes from the inner end of the section B to have an end portion within the part 14 of the section A.

The bearing means 10 connects the sections A and B for free relative rotation. The means 10 comprises an anti-friction bearing engaged between the part 15 of the section A and the section B. The bearing comprises an inner race 27 engaged around the section B, an outer race 28 engaged within the part 15 and a series of balls 29 engaged between the two races. The inner race 27 has its inner end in engagement with the flange 25. A safety lock ring 30 is engaged in an annular groove in the exterior of the section B and cooperates with the outer end of the inner race 27. The outer race 28 has its inner end cooperating with a side face of the flange 23. A tubular lock or retaining nut 31 is threaded in the outer end of the part 15 and engages against the outer end of the outer race 28. Spaced radial grooves 32 are provided in the outer end of the nut 31, see Fig. 2. A safety lock wire 33 is set in an annular groove in the exterior of the part 15 and has a lug or finger 34 on one end which projects inwardly through a radial opening in the wall of the part 15 and cooperates with a groove 32 to prevent unthreading of the nut 31. It will be seen that the anti-friction bearing arranged with its races 27 and 28 between the flanges 23 and 25 and the lock rings or parts 30 and 31 is operable to transmit axial forces in both directions as well as radial forces and thus positively connects the sections A and B for free relative rotation.

The sealing means 11 serves to prevent the leakage of fluid under pressure from between the sections A and B. The sealing means 11 is of the dual type embodying two spaced sealing elements. The sealing means 11 includes a cage 35. The cage 35 is a tubular member of channel or U-shaped cross section having its open side or mouth facing inwardly. The cage 35 is engaged in the part 15 between the inner side of the flange 23 and the bead 24 of the part 14. In Fig. 1 of the drawing it will be seen that one end wall of the cage 35 bears against the inner side of the flange 23 and the other end wall of the cage bears against the bead 24.

The sealing means 11 further includes what may be termed a first sealing ring 36 engaged between a pair of washers 37. The washers 37 are engaged within the cage 35 and one washer bears against the inner end wall of the cage. The washers are proportioned to be spaced clear of the section B. The sealing ring 36 extends inwardly beyond the washers 37, having a protruding active sealing lip of inwardly diminishing cross section. This sealing lip is pitched inwardly and toward the inner end of the section B. It will be seen that the fluid pressure from the line acting on the sealing lip of the ring 36 forces the ring into tighter sealing engagement with the section B. The sealing ring 37 is formed of a selected sealing material such as rubber, rubber composition, synthetic rubber, or the like.

The sealing means 11 further includes a second sealing ring 38 arranged within the cage 35 to engage against the outer end wall of the cage. The sealing ring 38 is substantially L-shaped in transverse cross section having a leg or lip which bears inwardly against the section B. A metal ring 39 of L-shaped cross section rests against the outer washer 37 and has its leg cooperating with the sealing ring 38 to hold the sealing ring in position. A spring ring 40 constantly contracts against the active inner lip of the sealing ring 38 to maintain it in effective sealing engagement with the section B. It will be seen that the dual sealing means embodying the two spaced sealing rings 36 and 38 effectively seals with the section B to prevent the leakage of fluid pressure from between the two sections A and B.

The contact means 12 maintains the sections A and B in electrical connection or contact during relative rotation between the sections and at all other times. The means 12 includes a contact ring 41 of suitable conductive material engaged around the protruding inner end of the tube 13 and engaged against the inner end of the section B. The contact means further includes a series of brushes or contacts 42 of carbon or other suitable material engaging the clear or exposed end of the ring 41. The contacts 42 are arranged within the annular groove 19 of the part 14 to bear against the inner wall of the groove and to protrude from the mouth of the groove. A spring ring 43 bears in elongate notches 44 in the outer sides of the contacts 42 to keep the contacts in their correct positions and to constantly urge them inwardly against the inner wall of the groove 19. Coiled springs 45 are provided in the bores 22. The springs 45 are engaged under compression between the bottom of the bores and the ends of the contacts 42 and constantly urge the contacts against the ring 41 and constantly urge the ring 41 against the end of the section B, thus maintaining an uninterrupted electrical engagement between the sections A and B.

It will be observed that the contact means 12 provides for a direct electrical connection between the section A and the tube 13. The contacts 42 are constantly urged against the inner wall of the groove 19 and against the ring 41 which in turn bears against the tube 13. It will be noted that the sealing means 10 prevents dust from the contact means 12 from reaching the anti-friction bearing means 10.

It is believed that the operation of the joint or connection of the invention will be understood from the foregoing detailed description. The bearing means 10 connects the sections A and B for free relative rotation and positively prevents relative axial movement of the sections. As described above, the sealing means 11 is effective in preventing the leakage of fluid pressure from between the sections and the contact means 12 maintains electrical connections between the sections. The anti-friction bearing means 10 is easily made accessible for servicing, lubricating and replacement by removing the lock nut 31 and the spring ring 30. The sealing means 11 and the contact means 12 are readily made accessible by disconnecting the section 14 from the section 15. It is to be observed that the means 10, 11 and 12 may be easily made accessible without disturbing the section B or the tube 13. The joint is compact and light in weight and is very durable.

Having described only a typical preferred form and application of my invention, I do not wish to be limited or restricted to the specific details herein set forth, but wish to reserve to myself any variations or modifications that may appear to those skilled in the art, or fall within the scope of the following claims:

Having described my invention, I claim:

1. A joint of the character described including a tubular outer section comprising two detachably connected parts, a tubular inner section received in the outer section, anti-friction bearing means in one of said parts connecting the sections for free relative rotation and adapted to be removed from the outer end of said part, sealing means in said part at the inner end portion thereof for preventing the leakage of fluid from between the sections to the bearing and located in said part and confined therein by the other part and adapted to be removed from the other end of said part upon the disconnection of said parts, and contact means in the other part for maintaining the sections in electrical connection.

2. A joint of the character described including a tubular outer section comprising two detachably connected parts, a tubular inner section received in the outer section, an external annular flange on the inner section, an internal annular flange on one of said parts facing the outer end of said part, an anti-friction bearing in the outer end portion of said part for connecting the sections for free relative rotation and having one end engaged with corresponding ends of said flanges, a nut threaded directly to said part closing the outer end of said part around the inner section and engaging the other end of said bearing to retain it, sealing means in the inner end portion of said part bearing against the other side of said internal flange and confined in said part by the other part and sealing between the sections to prevent the leakage of fluid therebetween and to the bearing, said other part serving to hold the sealing means against said internal flange, and a contact ring in said other part engaging the end of the inner section for maintaining the sections in electrical contact.

3. A joint of the character described including a tubular outer section comprising two detachably connected parts, a tubular inner section received in the outer section, an external annular flange on the inner section, an internal annular flange on one of said parts, an anti-friction bearing in said part for connecting the sections for free relative rotation and having one end engaged with corresponding ends of said flanges, a nut threaded directly to said part closing the outer end of said part and engaging the other end of said bearing, sealing means in the inner end portion of said part bearing against the other side of said internal flange and sealing between the sections to prevent the leakage of fluid therebetween and to the bearing, said other part serving to hold the sealing means against said internal flange, and contact means in said other part for maintaining the sections in electrical contact including a contact ring engaging the end of the inner section and a spring urging the ring toward the inner section, the sealing means and contact means being accessible from the inner ends of their respective supporting parts for servicing and removal upon the disconnection of said parts.

4. A joint of the character described including a tubular outer section comprising two detachably connected parts arranged with their inner ends in abutting engagement, a tubular inner section received in the outer section, an external annular flange on the inner section, an internal annular flange on one of said parts, an anti-friction bearing in said part for connecting the sections for free relative rotation and having one end engaged with corresponding ends of said flanges, a nut removably threaded directly in the outer end of said part and engaging the other end of said bearing, sealing means inserted in said part from its inner end and confined in said part by the other part for sealing between the sections and keeping fluid from the bearing and engaging against the other side of said internal flange, said other part serving to hold the sealing means in the operative position, and a contact ring engaged in said other part in contact with the inner section for maintaining the sections in electrical contact.

5. A joint of the character described including a tubular outer section comprising two detachably connected parts, a tubular inner section received in the outer section and terminating therein, an external annular flange on the inner section, an internal annular flange on one of said parts, an anti-friction bearing in said part for connecting the sections for free relative rotation and having one end engaged with corresponding ends of said flanges, a nut removably threaded in the outer end of said part and engaging the other end of said bearing, sealing means inserted in said part from its inner end and confined in said part by the other part for sealing between the sections and engaging against the other side of said internal flange, the sealing means engaging the exterior of the inner section between the bearing and the inner end of the inner section so fluid is kept from the bearing, said other part serving to hold the sealing means in the operative position, and contact means in said other part for maintaining the sections in electrical contact, the contact means being inserted into said other part from its inner end to be accessible when said parts are disconnected and include a contact ring engaged in the outer section and bearing against the end of the inner section.

6. A joint of the character described including a tubular outer section comprising two detachably connected parts, a tubular inner section received in the outer section, an external annular flange on the inner section, an internal annular flange on one of said parts, an anti-friction bearing in said part for connecting the sections for free relative rotation and having one end engaged with corresponding ends of said flanges, a nut removably threaded in the outer end of said part and engaging the other end of said bearing, sealing means inserted in said part from its inner end and confined in said part by the other part for sealing between the sections and engaging against the other side of said internal flange, said other part serving to hold the sealing means in the operative position and having an annular axially extending groove entering it from its inner end, and contact means for maintaining the sections in electrical contact including a ring in said other part engaging the inner end of the inner section to have electrical contact therewith, and contacts in said groove having electrical contact with said other part and engaging the ring to have electrical contact therewith.

7. A joint of the character described including a tubular outer section comprising two detachably connected parts, a tubular inner section received in the outer section, an external annular flange on the inner section, an internal annular flange on one of said parts, an anti-friction bearing in said part for connecting the sections for free relative rotation and having one end engaged with corresponding ends of said flanges, a nut removably threaded in the outer end of said part and engaging the other end of said bearing, sealing means inserted in said part from its inner end for sealing between the sections and engaging against the other side of said internal flange, said means keeping fluid from the bearing, said other part serving to hold the sealing means in the operative position and having an annular axially extending groove entering it from its inner end, and contact means for maintaining the sections in electrical contact including a ring in said other part bearing against the inner end of the inner section, contacts in said groove in contact with said other part for engaging the ring, and spring means for urging the contacts against the ring and for urging the ring against the inner end of the inner section.

8. A joint of the character described including a tubular outer section comprising two detachably connected parts, a tubular inner section received in the outer section, an external annular flange on the inner section, an internal annular flange on one of said parts, an anti-friction bearing in said part for connecting the sections for free relative rotation and having one end engaged with corresponding ends of said flanges, a nut removably threaded in the outer end of said part and engaging the other end of said bearing, sealing means inserted in said part from its inner end for sealing between the sections to keep fluid from the bearing and engaging against the other side of said internal flange, said other part serving to hold the sealing means in the operative position and having an annular axially extending groove entering it from its inner end, and contact means for maintaining the sections in electrical contact including a ring in said other part engaging the inner end of the inner section, contacts in said groove for engaging the ring, means for maintaining the contacts in engagement with a wall of the groove, and spring means for urging the contacts against the ring and for urging the ring against the inner end of the inner section.

9. A joint of the character described including a tubular outer section comprising two detachably connected parts, a tubular inner section received in the outer section, an external annular flange on the inner section, an internal annular flange on one of said parts, an anti-friction bearing in said part for connecting the sections for free relative rotation and having one end engaged with corresponding ends of said flanges, a nut removably threaded in the outer end of said part and engaging the other end of said bearing, sealing means inserted in said part from its inner end for sealing between the sections and engaging against the other side of said internal flange and keeping fluid from the bearing, said other part serving to hold the sealing means in the operative position, contact means in said other part for maintaining the sections in electrical connection including a ring slidably engaging the inner end of the inner section, and contacts engaged in said other part and engaging the ring, and a tubular conductor extending through the inner section and engaging in said ring.

DWIGHT M. PHILLIPS.